(12) United States Patent
Zhu

(10) Patent No.: US 11,216,104 B2
(45) Date of Patent: Jan. 4, 2022

(54) PRESSURE-SENSITIVE TOUCH DISPLAY PANEL AND DRIVING METHOD THEREOF

(71) Applicant: WUHAN CHINA STAR OPTOELECTRONICS SEMICONDUCTOR DISPLAY TECHNOLOGY CO., LTD., Hubei (CN)

(72) Inventor: Qiwen Zhu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 493 days.

(21) Appl. No.: 16/309,282

(22) PCT Filed: Sep. 28, 2018

(86) PCT No.: PCT/CN2018/108174
§ 371 (c)(1),
(2) Date: Dec. 12, 2018

(87) PCT Pub. No.: WO2020/015188
PCT Pub. Date: Jan. 23, 2020

(65) Prior Publication Data
US 2021/0223929 A1    Jul. 22, 2021

(30) Foreign Application Priority Data
Jul. 17, 2018  (CN) .......................... 201810786156.5

(51) Int. Cl.
*G06F 3/041* (2006.01)

(52) U.S. Cl.
CPC ........ *G06F 3/04146* (2019.05); *G06F 3/0416* (2013.01)

(58) Field of Classification Search
CPC ................. G06F 3/0445; G06F 3/0412; G06F 2203/04105; H01L 27/323
See application file for complete search history.

(56) References Cited

U.S. PATENT DOCUMENTS

| 8,638,311 B2 | 1/2014 | Kang et al. |
| 2018/0018052 A1* | 1/2018 | Yang ...................... G06F 3/0412 |

(Continued)

FOREIGN PATENT DOCUMENTS

| CN | 106610747 A | 5/2017 |
| CN | 107491215 A | 12/2017 |
| CN | 107731365 A | 2/2018 |

*Primary Examiner* — Priyank J Shah

(57) ABSTRACT

A pressure-sensitive touch display panel and a driving method thereof are provided. The panel includes a substrate, an OLED structure layer and a touch electrode layer. The OLED structure layer has a cathode layer. The touch electrode layer includes driving electrodes and sensing electrodes. The pressure-sensitive touch display panel has a display stage and a pressure-sensitive touch stage within display time for one frame. In the display stage, the cathode layer loads a common voltage signal for allowing the OLED structure layer to display; in the pressure-sensitive touch stage, the touch electrode layer is configured to sense at least one touch position. When the touch electrode layer senses at least one touch position, the cathode layer loads a pressure detection signal for the touch position so as to determine level of pressure at the touch position by a change in capacitance between the cathode layer and the driving electrodes.

19 Claims, 3 Drawing Sheets

(56) References Cited

U.S. PATENT DOCUMENTS

| | | |
|---|---|---|
| 2018/0047794 A1 | 2/2018 | Weng et al. |
| 2018/0321778 A1* | 11/2018 | Lee .................... G06F 3/04166 |
| 2019/0064955 A1* | 2/2019 | Wang ................... G06F 3/0412 |
| 2019/0095025 A1* | 3/2019 | Keum .................. G02B 5/3033 |
| 2019/0243493 A1* | 8/2019 | Ding .................... G06F 3/0412 |
| 2019/0361559 A1* | 11/2019 | Guo ....................... H01L 41/27 |

* cited by examiner

PRESSURE-SENSITIVE TOUCH DISPLAY PANEL AND DRIVING METHOD THEREOF

FIELD OF THE INVENTION

The present disclosure relates to a touch display panel, and more particularly to a pressure-sensitive touch display panel and a driving method thereof.

DESCRIPTION OF THE RELATED ART

Pressure sensing is a technology enabling an electronic device to sense the level of touch pressure so as to invoke different functions. At present, in the display field, particularly in the field of mobile phones or tablet computers, the pressure sensing is realized by providing an additional mechanism in a backlight portion of a liquid crystal display panel or in a middle frame portion of a mobile phone.

At present, in the display field, the pressure touch structure is mainly capacitive and realized by attaching a sensing layer on the back of a display module. Since the middle frame of the display module will be highly deformed relative to the sensing layer when it is under pressure, the pressure sensing may be realized by detecting a change in capacitance between the sensing layer and the middle frame. However, by this technology, the production cost will be increased and a larger assembly space is required, so that it is disadvantageous for lightweight and thinned design of display screens.

Therefore, it is necessary to provide a pressure-sensitive touch display panel and a driving method thereof in order to solve the problems in the prior art.

SUMMARY OF THE INVENTION

In view of the deficiencies in the prior art, a main objective of the present invention is to provide a pressure-sensitive touch display panel and a driving method thereof, by which the pressure-sensitive touch can be realized without any additional procedure and assembly space, the manufacture cost can be reduced and the sensitivity of the pressure-sensitive touch can be improved.

To achieve the above objective of the present invention, the present invention provides a pressure-sensitive touch display panel, including: a substrate; an OLED structure layer which is arranged on the substrate and includes a cathode layer; and a touch electrode layer which is arranged above the OLED structure layer and includes driving electrodes and sensing electrodes, wherein the pressure-sensitive touch display panel has a display stage and a pressure-sensitive touch stage within the display time for one frame; in the display stage, the cathode layer loads a common voltage signal for allowing the OLED structure layer to display; in the pressure-sensitive touch stage, the touch electrode layer is used for sensing at least one touch position; when the touch electrode layer senses at least one touch position, the cathode layer loads a pressure detection signal for the touch position so as to determine the level of pressure at the touch position by a change in capacitance between the cathode layer and the driving electrodes.

In one embodiment of the present invention, the OLED structure layer further includes an anode layer and a functional layer, wherein the anode layer is arranged on the substrate, the functional layer is arranged on the anode layer, and the cathode layer is arranged on the functional layer.

In one embodiment of the present invention, the cathode layer comprises a plurality of cathodes arranged side by side, wherein the pressure detection signal is loaded onto a cathode in the cathode layer corresponding to the touch position.

In one embodiment of the present invention, the pressure-sensitive touch display panel further comprises a deformable layer arranged between the cathode layer and the touch electrode layer.

In one embodiment of the present invention, the pressure-sensitive touch display panel further comprises a packaging layer mounted on the cathode layer, wherein the deformable layer is arranged between the packaging layer and the touch electrode layer.

In one embodiment of the present invention, the deformable layer is made of transparent resin material.

In one embodiment of the present invention, the pressure-sensitive touch display panel further comprises a protective layer mounted on a surface of the touch electrode layer.

In one embodiment of the present invention, the protective layer is a glass substrate or a substrate made of transparent resin material.

The present invention further provides a method for driving the pressure-sensitive touch display panel described above. The method includes the following steps: step S101: in a display stage, inputting a common voltage signal into a cathode layer; step S102: in a pressure-sensitive touch stage, determining, by a change in capacitance between driving electrodes and sensing electrodes of a touch electrode layer, whether the pressure-sensitive touch display panel is touched and determining a touch position; and step S103: if the pressure-sensitive touch display panel is touched, applying a pressure detection signal to a cathode corresponding to the touch position, and determining the level of pressure at the touch position by a change in capacitance between the cathode to which the pressure detection signal is applied and the driving electrodes.

In the present invention, the display time for one frame is mainly divided into a display stage and a pressure-sensitive touch stage; the normal display of the OLED structure is realized in the display stage; and, in the pressure-sensitive touch stage, the touch electrode layer first senses whether the surface of the panel is touched, and then, when it is sensed that the surface of the panel is touched, the cathode layer of the OLED structure is used also as the pressure sensing and detecting electrode to further determine the level of pressure at the touch position by the change in capacitance between the cathode layer and the driving electrodes. In this way, the pressure-sensitive touch can be realized without any additional procedure and assembly space, the manufacture cost can be reduced, and the sensitivity of the pressure-sensitive touch can be improved.

DETAILED DESCRIPTION OF THE PREFERRED EMBODIMENTS

To make the objectives, features and advantages of the present invention more apparent and comprehensible, preferred embodiments of the present invention will be listed and described in detail hereinafter with reference to the accompanying drawings. Besides, the directional expressions as used herein, such as "upper", "lower", "front", "rear", "left", "right", "inside", "outside" or "side", merely refer to the directions shown in the accompanying drawings. Therefore, the used directional expressions are used for describing and understanding the present invention, rather than limiting the present invention.

Figure 1:
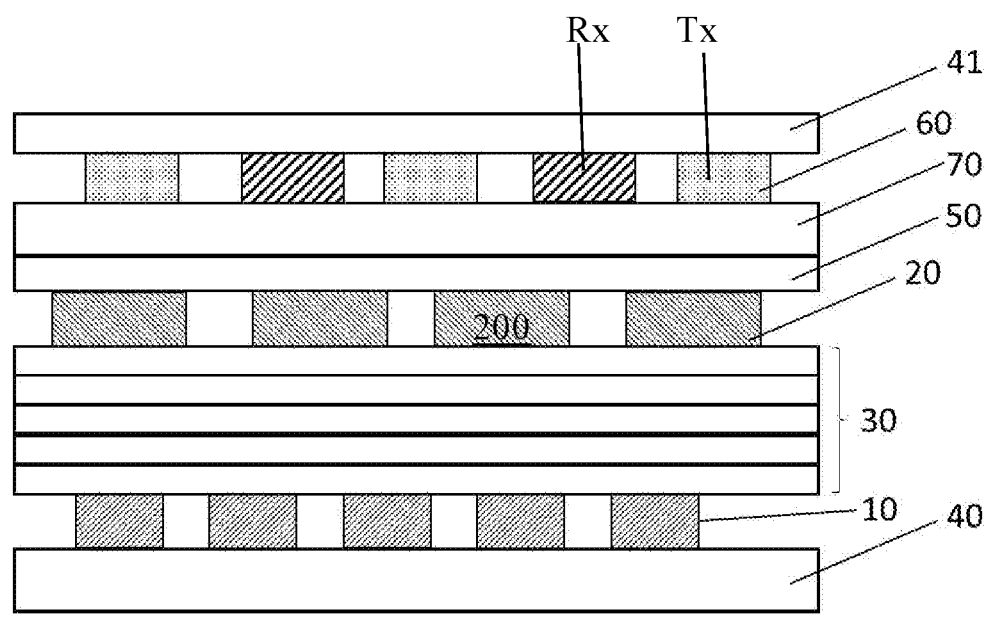
FIG. 1 is a sectional view of a pressure-sensitive touch display panel according to an embodiment of the present invention.

Reference will be made to FIG. 1. FIG. 1 is a sectional view of a pressure-sensitive touch display panel according to an embodiment of the present invention. The pressure-sensitive touch display panel is an Organic Light-Emitting Diode (OLED) display panel, mainly including a substrate 40, an OLED structure layer and a touch electrode layer 60.

The substrate 40 may be a glass substrate or a plastic substrate.

The OLED structure layer is arranged on the substrate 40 and includes a cathode layer 20, an anode layer 10 and a functional layer 30. The anode layer 10 is arranged on the substrate 40, the functional layer 30 is arranged on the anode layer 10, and the cathode layer 20 is arranged on the functional layer 30. Specifically, in a preferred embodiment, the cathode layer 20 includes a plurality of cathodes 200 arranged side by side, which may be a plurality of stripped electrodes arranged side by side; and, the anode layer 10 also includes a plurality of anodes arranged side by side, which may also be a plurality of stripped electrodes arranged side by side, wherein the cathodes 200 arranged side by side and the anodes arranged side by side are vertically staggered with each other, and intersections of the cathodes and the anodes form pixels. The functional layer 30 may specifically include a Hole Transport Layer (HTL), an Emission Material Layer (EML) and an Electron Transport Layer (ETL).

Figure 2:
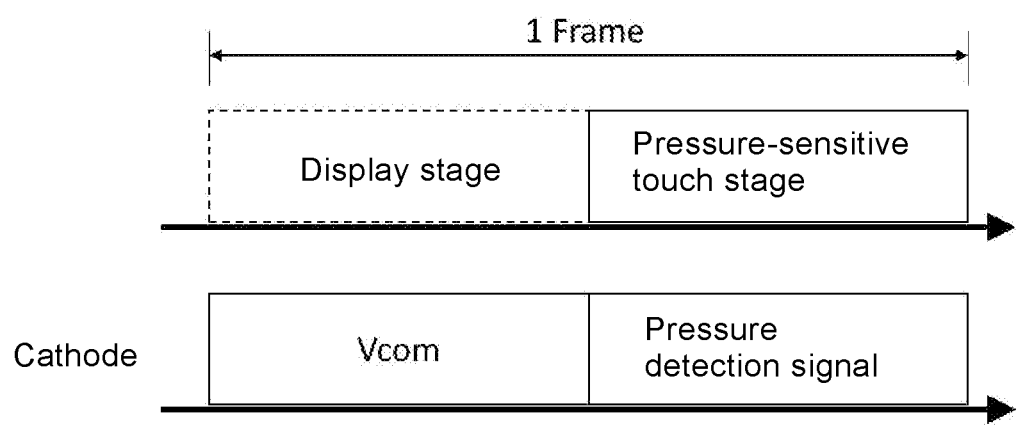
FIG. 2 is a timing diagram of signals for controlling the pressure-sensitive touch display panel within the display time for one frame according to the present invention.
Figure 3:
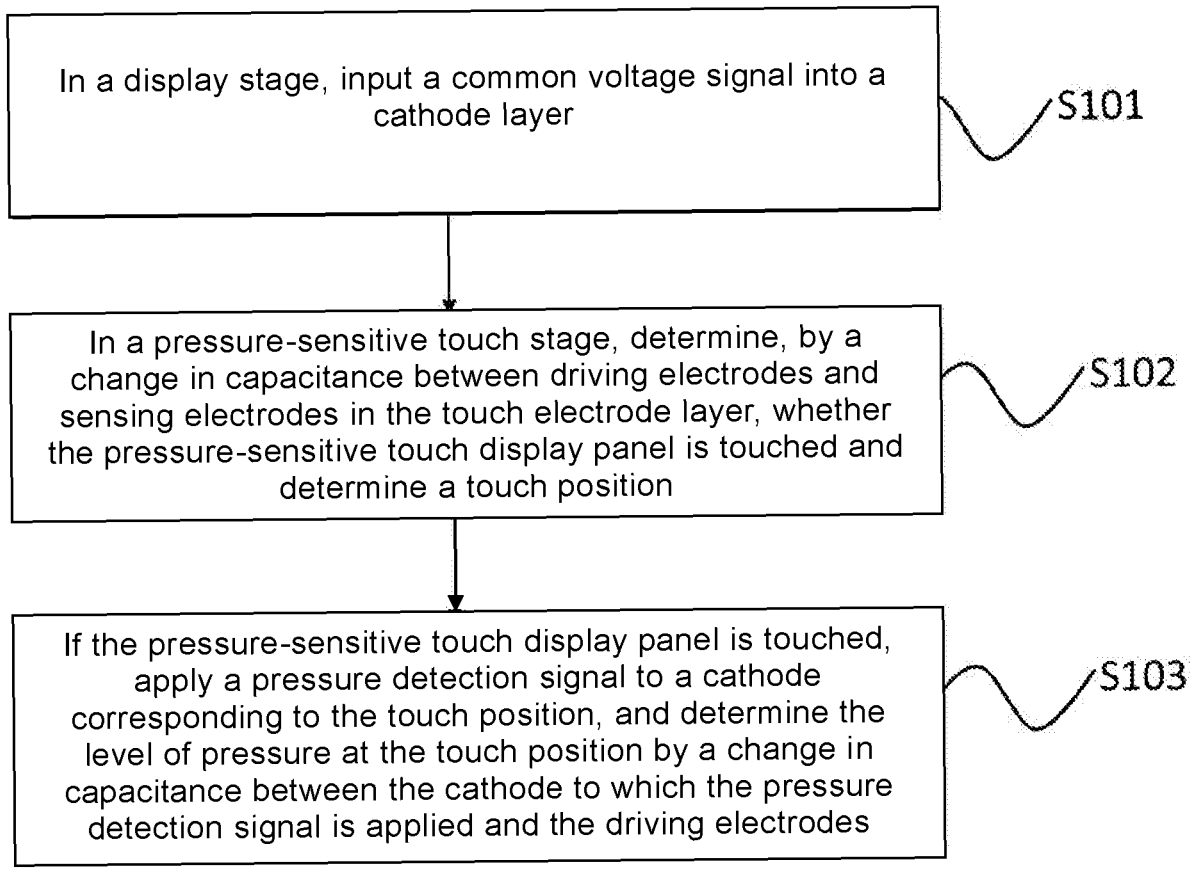
FIG. 3 is a flowchart of a method for driving a pressure-sensitive touch display panel according to an embodiment of the present invention.

The touch electrode layer 60 is arranged above the OLED structure layer and includes driving electrodes Tx and sensing electrodes Rx. Specifically, the driving electrodes Tx and the sensing electrodes Rx may consist of a plurality of stripped electrodes arranged side by side, respectively. Further, reference will be made to FIG. 2. FIG. 2 is a timing diagram of signals for controlling the pressure-sensitive touch display panel within the display time for one frame according to the present invention. As shown in FIG. 2, the pressure-sensitive touch display panel has a display stage and a pressure-sensitive touch stage within the display time for one frame. In the display stage, the cathode layer 20 loads a common voltage signal for allowing the OLED structure layer to display. In the pressure-sensitive touch stage, when the pressure-sensitive touch display panel is touched, the capacitance between the driving electrodes Tx and the sensing electrodes Rx of the touch electrode layer 60 will change, so that at least one touch position can be sensed. Then, when the touch electrode layer 60 senses at least one touch position, the cathode layer 20 loads a pressure detection signal for the touch position so as to determine the level of pressure at the touch position by the change in capacitance between the cathode layer 20 and the driving electrodes Tx. Specifically, the cathode layer 20 may load the pressure detection signal by a pressure detection chip. In an embodiment, the pressure detection signal is loaded onto a cathode 200 in the cathode layer 20 corresponding to the touch position.

By the above structure, in the present invention, both the position and the level of pressure of a touch operation can be sensed in the pressure-sensitive touch stage within the display time for one frame, and different touch functions can be invoked as required. In the present invention, by using the cathode layer of the OLED structure also as a pressure sensing and detecting electrode, the pressure-sensitive touch can be realized without any additional procedure and assembly space, the manufacture cost can be reduced, and the sensitivity of the pressure-sensitive touch can be improved.

In order to detect the change in capacitance between the driving electrodes Tx and the cathodes more easily, in an embodiment, the pressure-sensitive touch display panel may further include a deformable layer 70 arranged between the cathode layer 20 and the touch electrode layer 60. The change in thickness of the deformable layer may cause a change in capacitance between the cathode layer 20 used also as the pressure sensing and detecting electrode and the driving electrodes Tx, so that the level of pressure at the touch position may be determined. In a preferred embodiment, the deformable layer 70 is made of transparent resin material.

In an embodiment, the pressure-sensitive touch display panel further includes a packaging layer 50 which is arranged on the cathode layer 20 to protect the OLED structure layer. The deformable layer 70 is arranged between the packaging layer 50 and the touch electrode layer 60.

In an embodiment, the pressure-sensitive touch display panel further includes a protective layer 41 which is arranged on a surface of the touch electrode layer 60 to protect the touch electrode layer 60. In an embodiment, the protective layer 40 may be a glass substrate or a substrate made of transparent resin material.

The present invention further provides a method for driving the pressure-sensitive touch display panel described above, including the following steps:

step S101: in a display stage, inputting a common voltage signal into the cathode layer 20;

step S102: in a pressure-sensitive touch stage, determining, by a change in capacitance between the driving electrodes Tx and sensing electrodes Rx in the touch electrode layer 60, whether the pressure-sensitive touch display panel is touched and determining a touch position; and step S103: if the pressure-sensitive touch display panel is touched, applying a pressure detection signal to a cathode corresponding to the touch position, and determining the level of pressure at the touch position by a change in capacitance between the cathode to which the pressure detection signal is applied and the driving electrodes. Specifically, the pressure detection signal is loaded onto a cathode 200 in the cathode layer 20 corresponding to the touch position, and the level of pressure at the touch position is determined by a change in capacitance between the cathode 200 to which the pressure detection signal is applied and the driving electrodes Tx.

In conclusion, compared with the prior art, in the present invention, the display time for one frame is mainly divided into a display stage and a pressure-sensitive touch stage; the normal display of the OLED structure is realized in the display stage; and, in the pressure-sensitive touch stage, the touch electrode layer first senses whether the surface of the panel is touched, and then, when it is sensed that the surface of the panel is touched, the cathode layer of the OLED structure is used also as the pressure sensing and detecting electrode to further determine the level of pressure at the touch position by the change in capacitance between the cathode layer and the driving electrodes. In this way, the pressure-sensitive touch can be realized without any additional procedure and assembly space, the manufacture cost can be reduced, and the sensitivity of the pressure-sensitive touch can be improved.

The present invention has been described above by the related embodiments, but these embodiments are merely examples for implementing the present invention. It is to be noted that the disclosed embodiments are not intended to limit the scope of the present invention. Rather, modifications and equivalent arrangements without departing from the spirit and scope of the appended claims shall fall into the scope of the present invention.

What is claimed is:

1. A pressure-sensitive touch display panel, comprising:
a substrate;
an OLED structure layer which is arranged on the substrate and comprises a cathode layer, an anode layer and a functional layer, wherein the anode layer is arranged on the substrate, the functional layer is arranged on the anode layer, the cathode layer is arranged on the functional layer, and the cathode layer comprises a plurality of cathodes arranged side by side; and
a touch electrode layer which is arranged above the OLED structure layer and comprises driving electrodes and sensing electrodes, wherein the pressure-sensitive touch display panel has a display stage and a pressure-sensitive touch stage within the display time for one frame; in the display stage, the cathode layer loads a common voltage signal for allowing the OLED structure layer to display; in the pressure-sensitive touch stage, the touch electrode layer is used for sensing at least one touch position; when the touch electrode layer senses at least one touch position, the cathode layer loads a pressure detection signal for the touch position so as to determine the level of pressure at the touch position by a change in capacitance between the cathode layer and the driving electrodes, wherein the pressure detection signal is loaded onto a cathode in the cathode layer corresponding to the touch position.

2. The pressure-sensitive touch display panel according to claim 1, wherein the pressure-sensitive touch display panel further comprises a deformable layer arranged between the cathode layer and the touch electrode layer.

3. The pressure-sensitive touch display panel according to claim 2, wherein the pressure-sensitive touch display panel further comprises a packaging layer mounted on the cathode layer, wherein the deformable layer is arranged between the packaging layer and the touch electrode layer.

4. The pressure-sensitive touch display panel according to claim 2, wherein the deformable layer is made of transparent resin material.

5. The pressure-sensitive touch display panel according to claim 1, wherein the pressure-sensitive touch display panel further comprises a protective layer mounted on a surface of the touch electrode layer.

6. The pressure-sensitive touch display panel according to claim 5, wherein the protective layer is a glass substrate or a substrate made of transparent resin material.

7. A pressure-sensitive touch display panel, comprising:
a substrate;
an OLED structure layer which is arranged on the substrate and comprises a cathode layer, wherein the cathode layer comprises a plurality of cathodes arranged side by side; and
a touch electrode layer which is arranged above the OLED structure layer and comprises driving electrodes and sensing electrodes, wherein the pressure-sensitive touch display panel has a display stage and a pressure-sensitive touch stage within the display time for one frame; in the display stage, the cathode layer loads a common voltage signal for allowing the OLED structure layer to display; in the pressure-sensitive touch stage, the touch electrode layer is used for sensing at least one touch position; when the touch electrode layer senses at least one touch position, the cathode layer loads a pressure detection signal for the touch position so as to determine the level of pressure at the touch position by a change in capacitance between the cathode layer and the driving electrodes, wherein the pressure detection signal is loaded onto a cathode in the cathode layer corresponding to the touch position.

8. The pressure-sensitive touch display panel according to claim 7, wherein the OLED structure layer further includes an anode layer and a functional layer, wherein the anode layer is arranged on the substrate, the functional layer is arranged on the anode layer, and the cathode layer is arranged on the functional layer.

9. The pressure-sensitive touch display panel according to claim 7, wherein the pressure-sensitive touch display panel further comprises a deformable layer arranged between the cathode layer and the touch electrode layer.

10. The pressure-sensitive touch display panel according to claim 9, wherein the pressure-sensitive touch display panel further comprises a packaging layer mounted on the cathode layer, wherein the deformable layer is arranged between the packaging layer and the touch electrode layer.

11. The pressure-sensitive touch display panel according to claim 10, wherein the deformable layer is made of transparent resin material.

12. The pressure-sensitive touch display panel according to claim 7, wherein the pressure-sensitive touch display panel further comprises a protective layer mounted on a surface of the touch electrode layer.

13. The pressure-sensitive touch display panel according to claim 12, wherein the protective layer is a glass substrate or a substrate made of transparent resin material.

14. A method for driving a pressure-sensitive touch display panel as claimed in claim 7, comprising the following steps:
step S101: in a display stage, inputting a common voltage signal into a cathode layer;
step S102: in a pressure-sensitive touch stage, determining, by a change in capacitance between driving electrodes and sensing electrodes of a touch electrode layer, whether the pressure-sensitive touch display panel is touched and determining a touch position; and
step S103: if the pressure-sensitive touch display panel is touched, applying a pressure detection signal to a cathode corresponding to the touch position, and determining the level of pressure at the touch position by a change in capacitance between the cathode to which the pressure detection signal is applied and the driving electrodes.

15. The method according to claim 14, wherein, in the step S103, the pressure detection signal is loaded onto a cathode in the cathode layer corresponding to the touch position, and the level of pressure at the touch position is determined by a change in capacitance between the cathode to which the pressure detection signal is applied and the driving electrodes.

16. The method according to claim 14, wherein the OLED structure layer further includes an anode layer and a functional layer, wherein the anode layer is arranged on the substrate, the functional layer is arranged on the anode layer, and the cathode layer is arranged on the functional layer.

17. The method according to claim 14, wherein the cathode layer comprises a plurality of cathodes arranged side by side, wherein the pressure detection signal is loaded onto a cathode in the cathode layer corresponding to the touch position.

18. The method according to claim 14, wherein the pressure-sensitive touch display panel further comprises a deformable layer arranged between the cathode layer and the touch electrode layer.

19. The method according to claim 14, wherein the pressure-sensitive touch display panel further comprises a packaging layer mounted on the cathode layer, wherein the deformable layer is arranged between the packaging layer and the touch electrode layer.

\* \* \* \* \*